United States Patent [19]
Alderson et al.

[11] Patent Number: 5,019,963
[45] Date of Patent: May 28, 1991

[54] DATA PROCESSING NETWORK WITH UPGRADING OF FILES

[75] Inventors: Graham R. Alderson, Eastleigh; Peter R. MacFarlane, Winchester, both of United Kingdom; Tohru Mori, Fujisawa, Japan

[73] Assignee: International Business Machines Corporation, Armonk, N.Y.

[21] Appl. No.: 171,315

[22] Filed: Mar. 21, 1988

[30] Foreign Application Priority Data

Apr. 2, 1987 [GB] United Kingdom ............... 8707848

[51] Int. Cl.$^5$ ........................................... G06F 13/38
[52] U.S. Cl. .............................. 364/200; 364/228.4; 364/231; 364/282.2; 364/222.82
[58] Field of Search ... 364/200 MS File, 900 MS File

[56] References Cited

U.S. PATENT DOCUMENTS

| | | | |
|---|---|---|---|
| 4,558,413 | 12/1985 | Schmidt et al. | 364/300 |
| 4,714,992 | 12/1987 | Gladrey et al. | 364/200 |
| 4,875,159 | 10/1989 | Cary et al. | 364/200 |

FOREIGN PATENT DOCUMENTS

| | | |
|---|---|---|
| 0189031 | 7/1986 | European Pat. Off. . |
| 0191861 | 8/1986 | European Pat. Off. . |
| 2097156 | 10/1982 | United Kingdom . |

OTHER PUBLICATIONS

"Online Data Base Level Control", P. H. Benson et al, *IBM Technical Disclosure Bulletin*, vol. 18, No. 8, Jan. 1976, p. 2663.

"Remote Initial Program Load and Library Maintenance for Satellite Computers", B. B. Young et al., *IBM Technical Disclosure Bulletin*, vol. 13, No. 5, Oct. 1970, p. 1203.

Primary Examiner—Thomas M. Heckler
Attorney, Agent, or Firm—H. St. Julian; Casimer K. Salys; Douglas H. Lefeve

[57] ABSTRACT

A data processing network in which a plurality of workstations such as personal computers (PC) (12) are connected to a host processor (11) and contain PC programs at particular levels for controlling tasks on the personal computers. The personal computers send a signal to the host when they are about to conduct a task indicating which data files they have and at what level. The host has an object library containing a copy of each disk file for each version of PC program. The host determines if the personal computer has the latest level data file for the version of program at that personal computer and, if it does not, sends a copy of the latest level data file to the personal computer to replace the down-level data file. Preferably, the host checks if the personal computer has all the data files it needs for the particular task and, if it does not and if it should because of the version of PC program stored at the PC, the host can load a copy of the missing file to the personal computer. The host does not have to contain a record of all the levels of all the programs of all the personal computers connected to it. However, by updating the object library in the host, this arrangement ensures that all personal computers connected to it are automatically brought to the latest authorized level of data files as are required by the personal computer.

20 Claims, 3 Drawing Sheets

DATA PROCESSING NETWORK WITH UPGRADING OF FILES

TECHNICAL FIELD

The present invention relates to a data processing network of the type in which a plurality of work stations are connected to a host data processor.

BACKGROUND INFORMATION

Frequently such work stations will contain data files which need to be updated from time to time. Where the workstations are programmable and are constituted, for example, by a personal computer adapted to be connected to the host computer, the personal computer will contain computer programs which may require modifying from time to time to correct errors in the programs. Personal computer (PC) programs are normally supplied to users on magnetic diskettes. In reality the user does not buy the program but pays to the program owner a licence fee to use the PC program in accordance with the terms and conditions of the licence. If the user wishes to obtain a new version of the program, a new licence fee would be required.

Although computer programs are tested extensively before they are supplied to customers, it can and does happen that errors are found in them and schemes have been devised for handling the updating of defective programs, normally involving each program user needing to register his address with the program owner or the dealer through whom the program was obtained. The program owner or dealer then needs to contact each registered user to supply a new corrected PC program or to supply correction or patch information so that the user can change the old program by editing it. Apart from the expense to the program owner, this can mean inconvenience to the user and, especially where there are many personal computers on a single site, take a long time to install the new program on all of them.

Any solution to this upgrade problem should be cheap and quick.

IBM Technical Disclosure Bulletin, Vol. 18, No. 8, January 1976, page 2663, describes an online database level control arrangement in which a host computer updates a distributed database and ensures that each local subsystem is provided with the latest version of the data base stored at the host. When required, in an emergency procedure the host interrogates each subsystem to determine if it contains that part of the database needing to be updated. If it does, the host causes that part to be deleted at the subsystem, forcing that subsystem to obtain the latest level when it next requires that part of the database. Normal updating would occur after the subsystem had been powered off, for example during the night, by the host causing deletion of the down level data base during the power-up sequence, again forcing the subsystem to access the host for the upgraded data base when it requires to use that part of the data base.

Although there are certain similarities between data bases and computer programs, there are differences including the way in which computer programs are supplied to users and where there are various versions or releases of a computer program, it is very important that any upgraded information relating to a particular level or version is only supplied to a user authorised to be using that particular level or version.

SUMMARY OF THE INVENTION

An object of the invention is to provide a data processing network in which data files can be updated with little or no inconvenience to the users connected on the network and without requiring the host data processor to keep a record of the data files stored at each remote user.

Although the invention will be described in terms of a network in which programs are kept updated, the invention is just as applicable to network in which distributed data such as database material needs updating. To this end the term "data file" include files containing program data as well as files containing data such as database information.

According to the invention, the data processing network includes at least one host processor, to which processor is connected a plurality of workstations or local processors containing data files used at the workstations or local processors during tasks thereon. The host processor contains a copy of the data files stored at each workstation which may require updating. The network is characterized in that each workstation or local processor is adapted to send a signal to the host processor indicating which data files it is to use for a particular task and the level of those data files. The host processor is adapted to determine from said signal whether that workstation has data files at the latest level. If the determination shows that the workstation has a data file or data files not at the latest level a copy at the latest level is sent to the workstation to replace the down-level data file.

In a preferred embodiment of the invention, the host processor is provided with means for determining which version of a particular data file is contained within the terminal and for supplying to that terminal only an updated data file applicable to that version.

BRIEF DESCRIPTION OF THE DRAWINGS

The invention will now be particularly described, by way of example, with reference to the accompanying drawings, in which.

DESCRIPTION OF THE PREFERRED EMBODIMENT

Figure 1:
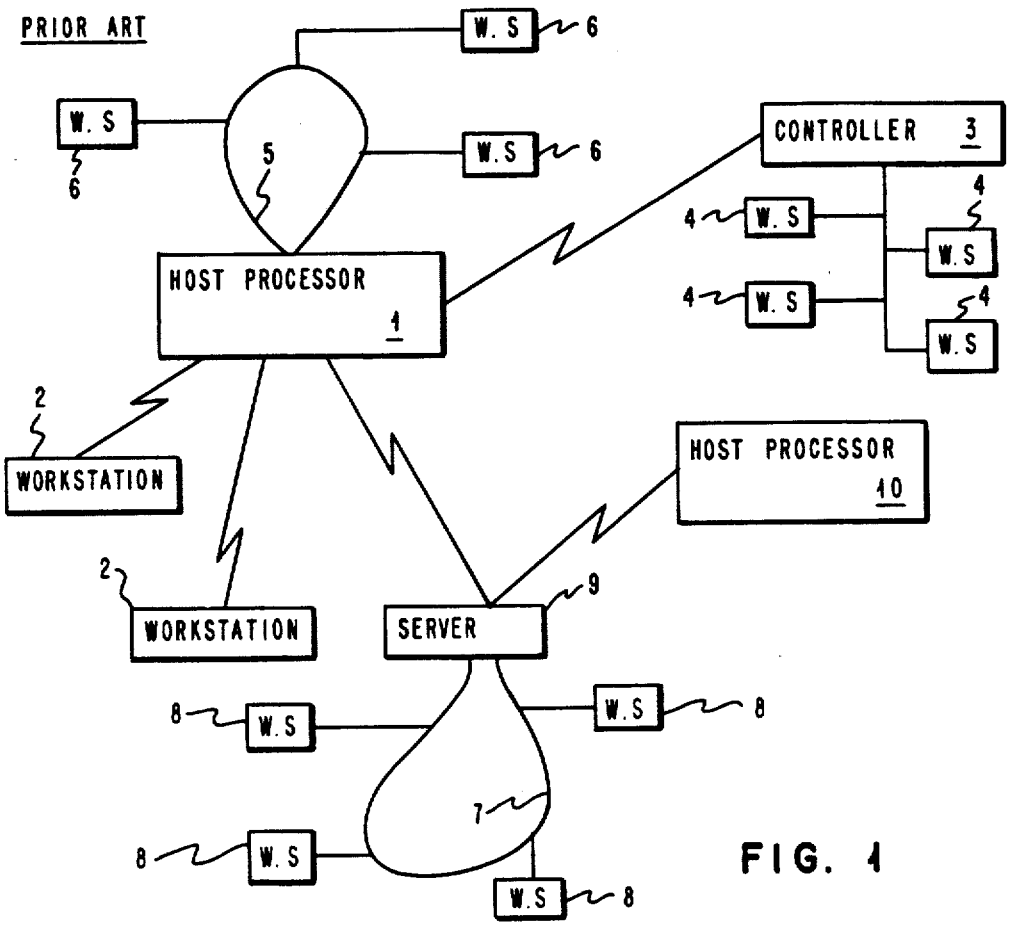
FIG. 1 is a block diagram showing a data processing network of known type and to which the invention may be applied.

Referring now to FIG. 1, a data processing network consists of a host processor 1 to which are connected a number of workstations. These workstations may be connected to the host processor 1 in a star configuration as represented by workstations 2 or through a controller controlled network as represented by controller 3 and workstations 4. Alternatively the workstation could be connected to the host processor, either locally as represented by loop 5 and workstations 6 or remotely as represented by loop 7 and workstations 8. In the latter case, the loop 7 may be a local area network (LAN) served by a server 9 connected to the host processor 1. One or more further host processors 10 may be provided to which some or all other various workstations 2, 4, 6 or 8 may be connected, either directly or indirectly.

Such data processing networks are known and no further description of the network per se is needed. The invention will be described in terms of workstations which are constituted by suitably programmed/configured personal computers such as the IBM Personal Computers, the IBM Personal Computer XT or the IBM Personal Computer AT or the IBM Personal System/2 personal computers. Generally, a personal computer will normally have a magnetic diskette file by means of which computer programs may be loaded on to it. It is possible to have a personal computer with no magnetic disc drives in which case any programming needs to be loaded over some kind of communications link.

In any event, the personal computer user will be provided with programs under some kind of licence agreement which determines how the program may be used and copied. Normally, the program supplier will undertake to provide some kind of correction procedure to correct errors which might be found in the program during their use. This represents a significant administrative and technical problem in view of the thousands of copies of programs which are licensed. The problem is compounded by the fact that there may be more than one version or release of a particular program with the user only being licensed for a particular version or release.

In accordance with the present invention, use is made of a library of data files stored within the host processor or processors and which is used to update data files within a particular connected personal computer (workstation) when that particular workstation requires a particular data file. There is no need for the host processor to keep a record of what data files are kept by all the workstations which can be connected to it. Neither is there a need for an emergency or regular distribution of data files as was suggested in the aforementioned IBM Technical Disclosure Bulletin.

Figure 2:
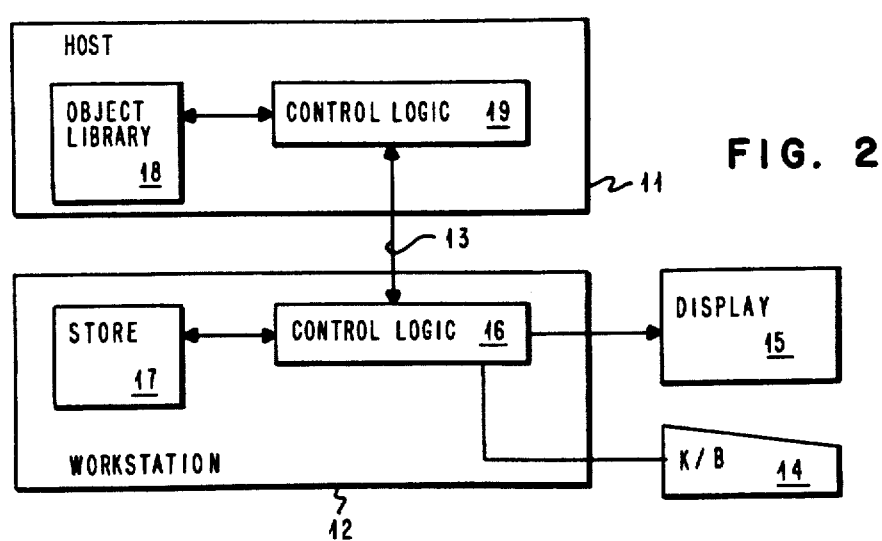
FIG. 2 is a block diagram showing a host processor and a remotely connected personal computer in which the host can update data files within the personal computer in accordance with the present invention.

FIG. 2 is a simplified block diagram in which a host processor 11 is shown connected to a workstation 12 over a communication link 13. As is normal, the workstation 12, constituted by a personal computer, includes a keyboard 14 and a display 15 operating under control of control logic 16 together with a store 17 for storing data and programs. Printers, plotters and other input/output devices, not shown, may also be connected to or form part of the workstation 12. The control logic 16 may be constituted by hardwired logic, programmed logic or combinations thereof. The store 17, normally a magnetic disk or diskette store, will contain one or more computer programs. The or each computer program will consist of a number of data files. The data files are variable in size and represent an identifiable block of code consisting of one or more code modules. If an error is found within the data file, that code either has to be replaced or modified to correct the error. Not only is the normal updating process expensive but it is also slow and, it can never be certain that a program which requires correction has been corrected.

The host processor 11 therefore is provided with a store 18 which contains a library of object code which may be required by workstations connected to that host processor. For each version/release of the or each PC program stored in the library 18 and which it is desired to update automatically, there will be a complete set of data files. If a data file requires to be updated for any reason for a particular release/version of a PC program, then that data file is updated. Once updated to the new level, the control logic 19 will ensure that any workstation 12 connected to the host processor 11 will be supplied with the new level data file appropriate to the release/version of the program authorised for that workstation when that data file is next required. In contrast to the aforementioned IBM Technical Disclosure Bulletin it is not necessary to force the workstation to request a new file by the host requesting all workstations to delete their down-level files.

Figure 3:
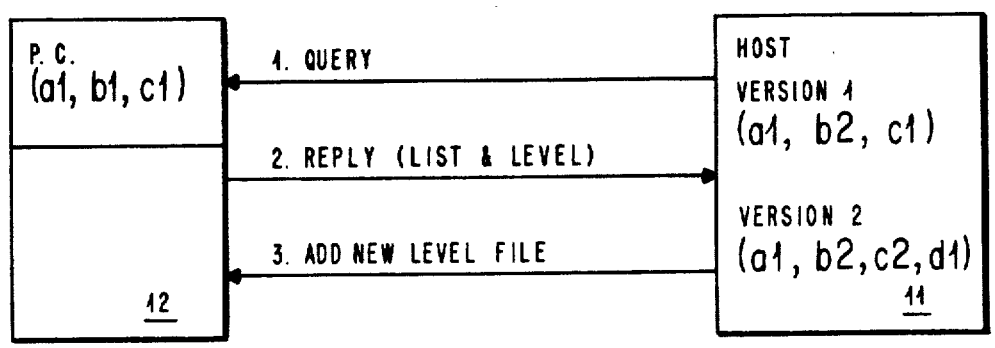
FIG. 3 is a chart summarising the operation of the invention.

FIG. 3 is a chart summarising the updating procedure. For the purposes of illustration, it is assumed that a particular PC program has been marketed in two versions, version 1 having data files a, b and c at levels 1, 2 and 1 respectively and represented by a1, b2 and c1 and version 2 having data files a, b, c and d at levels, 1, 2, 2 and 1 respectively. The object libraries of these two versions are stored in the host processor 11. The personal computer 12 has stored within it version 1 of the program with data files a, b and c all at level 1. In other words the version of the program installed in the personal computer 12 is at a down-level. The updating process starts with the host processor 11 first sending a query to the PC 12. This query can be a special query or, preferably, it forms part of a general enquiry from the host 11 to the PC 12. Thus with the GDDM program (GDDM is a trademark of International Business Machines Corporation) the host sends a general enquiry to the attached workstations so that the workstations can respond to the host to identify what type of workstation they are and what facilities they have installed: this response allows the GDDM program to configure the data and/or programs in the host into a form suitable for transmission to that particular type of workstation for action therein.

As a result of the query from the host 11, whether specific or general, the PC 12 responds with a reply which includes a list of the data files it has installed together with an indication of the levels of those files. Thus with the GDDM example, the PC 12 would add to its normal response a list of the data files and their levels. From the reply from the PC 12, the host 11 determines which version of the program is installed at the PC 12 and whether that version is at the latest level. If it is not, the host 12 sends a copy of the latest level of the data file required to bring the program up to the latest level. When the PC 12 receives the new-level data file, it erases the old-level and replaces it with the new-level. Thus, in the example shown, the host would have determined that the PC 12 had version 1 installed with data file b1 at a down level. The host would recognise that data file c1 is at the correct level for that version of the program, the higher level c2 being applicable to version 2 of the program.

The advantages of this arrangement over that shown in the aforementioned IBM Technical Disclosure Bulletin are:

1. The host does not have to spend time forcing every connected workstation to upgrade itself, deleting even correct-level data files.

2. Only one enquiry from the host is required, not one for each data file which may need up-dating. This gives a significant improvement in time and cost.

3. A copy of the upgraded file is available at the remote workstation before deletion of the old file. This is better from a systems integrity point of view should the communication link become inoperable.

4. It allows the workstation to be at a higher level than the host. This is important in multihost situations where the workstation may have been connected to a host at a higher level than one to which it was subsequently connected. The host will not update a data file which is at a higher level than the same data file in the host itself.

5. It allows the user to invoke updating from a remote host which is not necessarily the one to which he is normally connected. Thus the user may have become aware of a problem with his program, reported the problem to a customer service centre and, subseqeuntly, when that service centre has fixed the problem, the user can connect to the service centre to receive the upgrade without having to wait for his own host processor to be updated.

Like the aforementioned IBM Technical Disclosure Bulletin, the host does not have to keep a record of what programs and their levels that are installed in the workstations connected it it. Upgrading of the version stored in the host will ensure upgrading of the versions stored in the connected PCs as they are needed.

Clearly, the invention is most significant for use with PC programs which communicate with a host program. However, it is possible to provide this facility for any PC program installed on a PC provided that PC can communicate with a host computer which has a copy of that program's data files within the object library.

Where the host is able to recognise what version of a program is installed at the personal computer, the mechanism described can also be used to supply a data file to the PC should the PC's response indicate that it does not contain a data file which should be included in that version of the program.

Figure 4:
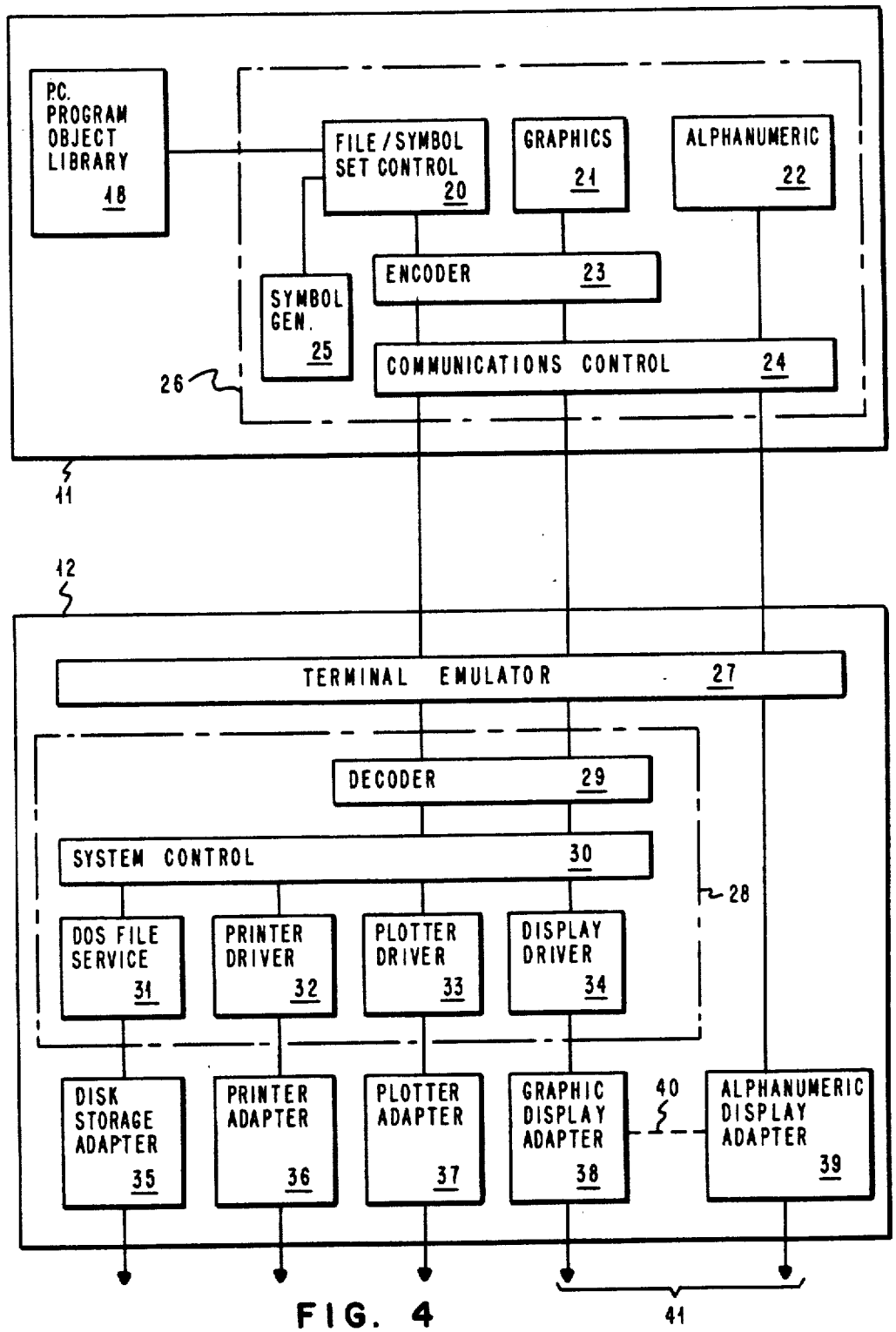
FIG. 4 is a block diagram showing how a host-based computer program may be implemented to update data files at a remotely connected personal computer.

A preferred embodiment of the invention will now be described with reference to FIG. 4 which is a block schematic of a host processor 11 having the GDDM program installed thereon with the PCLKF feature and a connected personal computer 12 having the GDDM-PCLK program installed therein. The GDDM-PCLK program allows the personal computer 12 to interact with the GDDM program at the host 11. The GDDM program at the host comprises various components including File and Symbol Set control code 20, graphics control code 21, alphanumeric control code 22, encoder control code 23, communications control code 24, and a symbol generation code 25. In addition, a PC program object library 18 contains copies of the data files which constitute the GDDM-PCLK program installed in the personal computer. There will be a set of data files for each version or release of the GDDM-PCLK program within the library 18.

The control code 20 to 25 is structured to constitute the GDDM base program (represented by outline 26) whilst the GDDM PCLKF feature provides the function for the library 18. The symbol generation code 25 generates symbols as data files and for this reason the object library 18 can share the control code 20 with it. The PC is connected to the host processor through a controller, not shown, such as the IBM 3274 controller which is only able to handle alphanumeric data on the link with the host processor 11. To this end, non-alphanumeric data needs to be encoded by the encoding code 23 so that it can be handled by the communications link. Communication over the link (protocols etc) is handled by means of the communication control code 24.

The PC 12 has installed therein a suitable terminal emulator 27 such as the IBM PC 3278 emulator to allow it to communicate with the 3274 controller. Also installed in the PC 12 is a copy of the GDDM-PCLK program shown generally at 28. The PCLK program 28 includes decode control code 29 for decoding the encoded non-alphanumeric code from the GDDM host program and system control code 30 for acting upon the decode data in conjunction with dedicated control code 31 to 34. DOS File Service control code 31 controls access by the DOS operating system to the disk storage (not shown) through disk storage adapter 35. Printer driver code 32 controls the flow of data to be printed through a printer adapter 36 to which may be connected any suitable printer, for example a matrix, ink jet or daisy wheel printer. Similarly plotter driver code 33 controls the flow of data through a plotter adapter 37 to a plotter, not shown.

The display driver 34 is control code which controls the flow of graphical data to a graphical display adapter 38 connected to a suitable graphics display, not shown. As indicated above, alphanumeric data can be transmitted without encoding (decoding) to an alphanumeric display adapter 39 connected to a suitable display device, not shown. In practice, the graphic display adapter 38 and alphanumeric display adapter 39 could be combined into a single display adapter as represented by dashed line 40. Moreover, the graphic and alphanumeric display devices, not shown, could be constituted by a single display device, as represented by bracket 41.

Each of the control code elements 29 to 34 constitutes a data file and for each possible version of the program 28, there will be a copy of the constituent data files in the object library 18. When the personal computer 12 indicates to the host 11 the data files it has for the particular task and the level of each of those data files, the host 11 checks which version is installed at the PC 12 and then checks if all data files are present and if they are at the latest level appropriate to that version. The program 28 is upgraded, if necessary, in the manner indicated above.

Figure 5:
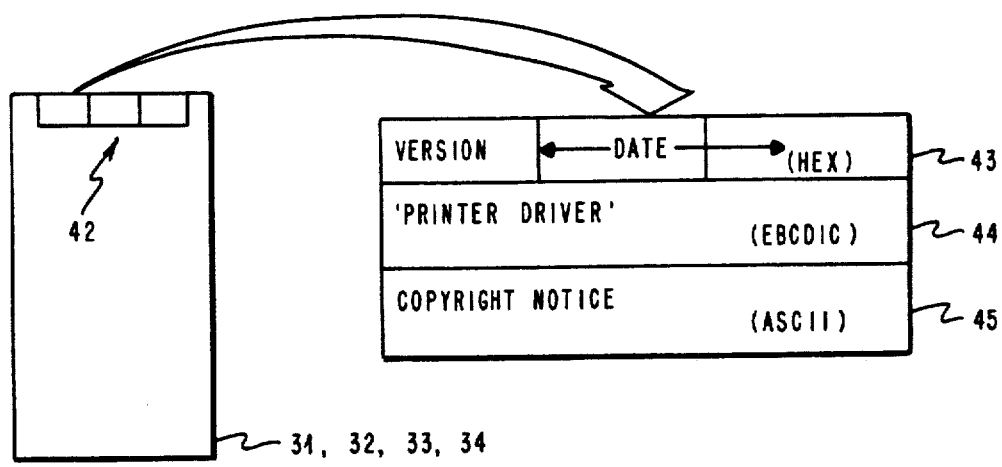
FIG. 5 shows the preferred structure of the data files.

FIG. 5 is a representation of a data file 29, 30, 31, 32, 33 or 34. At a fixed known offset from the beginning of the data file is a three-field block 42 of code. The first field 43 of the block 42 is a 4 byte number in hexadecimal code. The first byte indicates the version or release of the program, and the next three bytes represent the date, i.e. they indicate the particular level of that data file. Field 43 contains the information sent to the host by the personal computer.

The second field 44 of the block 42 is in EBCDIC code and contains the name of the particular data file. For example if the data file is printer driver 32, the name "printer driver" would be encoded in EBCDIC code within field 44 so that the name can be displayed to a programmer at the host processor 11. The third field 45 of the block 42 is encoded in ASCII code and contains the copyright notice for the data file: this ensures that the copyright notice will be readable on the display of the personal computer. The remaining part of the data file is, of course, encoded hexadecimally. This arrangement is preferred in the arrangement described but it will be apparent that other coding arrangements can be employed to suit the particular situation.

The invention brings benefits to the manufacturer of the PC programs in that there is a much simpler and cheaper mechanism by means of which his customers can be provided with updated programs. These are substantial benefits to the user too since where a user has many interconnected workstations he can ensure speedy updating of his data files. For all users, updating is automatic when the down-level data file is required: no updating process need be applied by the user.

We claim:

1. In a data processing network having at least one host processor connected to a plurality of workstations of various types containing different facilities installed thereon, the host processor containing a copy of a latest version of each of the facilities, a method of updating the facilities stored in the workstations, said method comprising the steps of:
    transmitting a query by the host processor to one or more of said plurality of workstations;
    transmitting a signal from each of the plurality of workstations to the host processor in response to the query indicating the type of workstation and facilities installed thereon; and
    updating by the host processor all the facilities stored on each of the respective plurality of workstations each having a version which is different from the latest version of the respective facilities stored in the host processor in response to the signal transmitted thereby.

2. The method as recited in claim 1 wherein the facilities are data files installed on each of the workstations.

3. The method as recited in claim 2 further comprising the step of configuring data in the host processor into a form suitable for transmission to a selected one of the plurality of workstations in response to said signal transmitted therefrom.

4. The method as recited in claim 3 wherein the plurality of workstations are personal computers.

5. The method as recited in claim 4 wherein the data files include modules of a personal computer program, and each of the data files further includes a block of code containing information determinative of the version of the program and a level of the data file.

6. The method as recited in claim 5 wherein the block of data file code further contains data at the host processor for identifying the data file and a field containing data displayable at the personal computer.

7. In a data processing network having at least one host processor connected to a plurality of workstations containing data files, the host processor containing a copy of a latest version of each of the data files, a method of updating the data files stored in the workstations, said method comprising the steps of:
    transmitting a signal by one of the plurality of workstations to the host processor indicating a plurality of data files to be used for a particular task;
    determining by the host processor whether the one workstation includes the latest version of the data files to be used for the particular task; and
    updating by the host processor all of the data files in the one workstation having a version which is different from the latest version of the respective data files stored in the host processor.

8. The method as recited in claim 7 further comprising the step of transmitting by the host processor to the one workstation additional data files required for the particular task as part of the updating by the host processor.

9. The method as recited in claim 8 wherein the step of determining includes the step of determining which version of the respective data files is stored at the one workstation.

10. The method as recited in claim 9 wherein the step of updating includes the step of sending a latest level data file to the one workstation.

11. The method as recited in claim 10 wherein the plurality of workstations are personal computers.

12. The method as recited in claim 11, wherein the data files include modules of a personal computer program, and each of the data files further includes a block of code containing information determinative of the version of the program and a level of the data file.

13. The method as recited in claim 12 wherein the block of data file code further contains data at the host processor for identifying the data file and a field containing data displayable at the personal computer.

14. A data processing system for updating data files stored in a plurality of workstations, said system having at least one host processor connected to the plurality of workstations, the host containing a copy of a latest version of each of the data files, comprising:
    means for transmitting a signal from one of the plurality of workstations to the host processor indicating a plurality of data files to be used for a particular task;
    means in the host processor responsive to the signal for determining whether the one workstation includes the latest version of the data files to be used for the particular task; and
    means for updating all of the data files in the one workstation having a version which is different from the latest version of the respective data files stored in the host processor.

15. The system as recited in claim 14 further comprising means for transmitting by the host processor to the one workstation additional data files required for the particular task as a part of the means for updating.

16. The system as recited in claim 15 wherein the means for determining includes means for determining which version of the respective data files is stored at the one workstation.

17. The system as recited in claim 16 wherein the means for updating includes means for sending a latest level data file to the one workstation.

18. The system as recited in claim 17 wherein the plurality of workstations are personal computers.

19. The system as recited in claim 18 wherein the data files include modules of a personal computer program, and each of the data files further includes a block of code containing information determinative of the version of the program and a level of the data file.

20. The system as recited in claim 19 wherein the block of data file code further contains data at the host processor for identifying the data file and a field containing data displayable at the personal computer.

* * * * *